No. 687,672. Patented Nov. 26, 1901.
W. J. BRAY.
BALL BEARING WHEEL FOR VEHICLES.
(Application filed May 3, 1901.)
(No Model.)
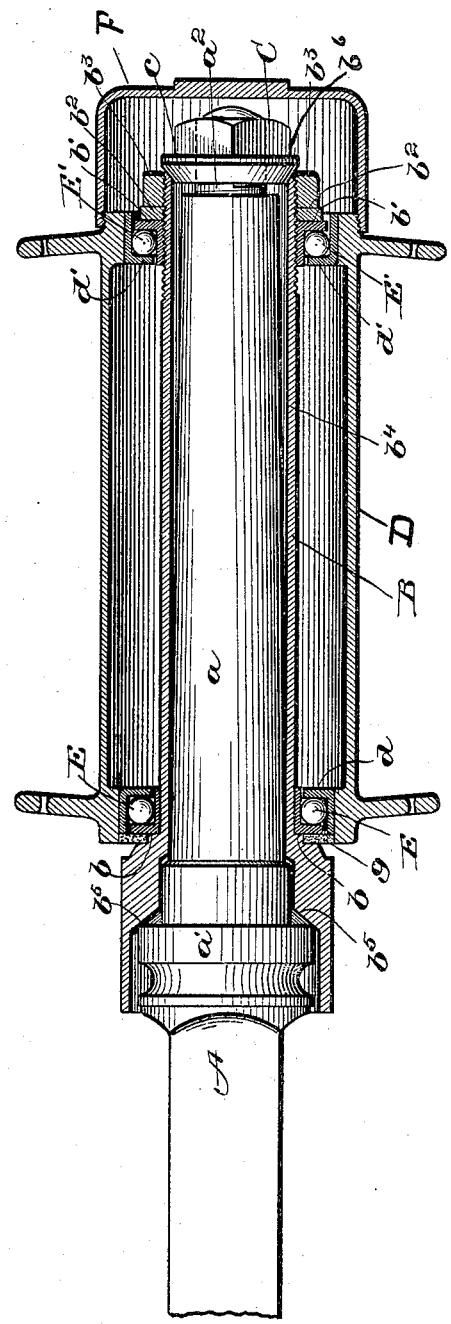
Witnesses:
Inventor:
Walter J. Bray
By Fred Gerlach
his Attorney.

UNITED STATES PATENT OFFICE.

WALTER J. BRAY, OF TIPTON, IOWA.

BALL-BEARING WHEEL FOR VEHICLES.

SPECIFICATION forming part of Letters Patent No. 687,672, dated November 26, 1901.

Application filed May 3, 1901. Serial No. 58,584. (No model.)

*To all whom it may concern:*

Be it known that I, WALTER J. BRAY, a resident of Tipton, in the county of Cedar, State of Iowa, have invented certain new and useful Improvements in Ball-Bearing Wheels for Vehicles, of which the following is a full, clear, and exact description.

The invention relates to vehicle-wheels provided with ball-bearings.

The object of the invention is to provide an improved ball-bearing wheel which can when desired be easily and quickly substituted for the usual wheel—e. g., when the vehicle is to be used over rough or muddy roads the ordinary steel-tired wheel is preferred and at other times a light pneumatic-tired wheel having ball-bearings is desired—and, further, the invention designs to provide an improved construction which can be easily and quickly applied to the familiar form of axle now in common use and designed for use with a hub having the familiar "cone" or "parallel" bearing.

The invention consists in the several novel features of construction hereinafter described, illustrated in the accompanying drawing, and more particularly defined by claims at the conclusion hereof.

The drawing shows the improved bearing in central longitudinal section and as applied to an axle of usual construction.

A denotes an axle of the form and construction now in general use and comprises a bearing portion $a$, an annular shoulder $a'$, and a reduced screw-threaded terminal $a^2$. A hollow sleeve B, carrying a fixed bearing-cone $b$ and an adjustable bearing-cone $b'$, held in place by non-revoluble washer $b^2$ and lock-nut $b^3$, fits around the axle. Sleeve B is formed with a straight bore or opening $b^4$, extending longitudinally therethrough, and at one end with an inclined annular shoulder $b^5$, designed to abut against shoulder $a'$ of the axle. A nut C is provided with a screw-thread to engage the screw-thread on the reduced terminal $a^2$ of the axle and a conical portion $c$, which engages a correspondingly-tapered seat $b^6$ of sleeve B. The nut serves to securely clamp the sleeve in fixed position on the axle, and conical shoulder $b^5$ and conical portion of the nut serve to position the sleeve concentrically about the axle, regardless of the diameter or shape of the bearing portion $a$ of the axle. In practice it has been found that the shape of the bearing portion varies—e. g., in some instances the axles are straight and in others they are slightly tapered or conical. The construction shown can be readily applied to an axle less in diameter than the bore $b^4$ of the sleeve, and it will be understood, therefore, that my improved construction of sleeve and bearing can be readily attached and fixedly held in true concentric position on axles of different sizes and regardless of the particular shape of the bearing portion of the axle. This feature has been found to be an important one, because it is not necessary to specially fit each sleeve according to the axle whereto it is to be applied.

D is a hub provided with suitable bearing-cups $d$ and $d'$, which, together with cones $b$ and $b'$, form bearings for series of balls E and E'. A dust-cap F is secured to the hub by a screw-thread and incloses the parts at the outer end of the axle. An elastic washer $g$, held between cone $b$ and a suitable shoulder on the sleeve, prevents entry of dust to balls E and cone $b$.

When the wheel is to be removed from the axle and another substituted, it is only necessary to remove dust-cap F and unscrew nut C. The wheel, hub, and sleeve can then be withdrawn laterally from the hub without disturbing the ball-bearings.

Having thus described my invention, what I claim as new, and desire to secure by Letters Patent, is—

1. The combination with an axle having an annular shoulder thereon, of a sleeve on said axle, a nut at the outer end of said axle, suitable tapered surfaces whereby the sleeve will be positioned around the axle at both ends thereof, said nut serving to secure the sleeve on the axle, a hub and a ball-bearing intermediate said sleeve and said hub.

2. The combination with an axle having an annular shoulder thereon, of a sleeve on said axle, a nut screw-threaded on the end of said axle, said sleeve having interior tapering portions at its ends, the tapering portion at one end engaging said shoulder, said nut having a conical part engaging the tapering portion at the other end of said sleeve, said parts being arranged to position and secure the sleeve on the axle, a hub, and a ball-bearing intermediate said hub and said sleeve.

3. The combination with an axle having a shoulder thereon, of a sleeve on said axle and having interior tapered portions at its ends, the tapered portion at the inner end engaging said shoulder, a nut on the end of said axle and having a conical part engaging the tapered portion at the outer end of said sleeve, bearing-cones on said sleeve, bearing-cups in said hub, and balls intermediate said cups and cones.

WALTER J. BRAY.

Witnesses:
 FRED GERLACH,
 FORRIS H. ALFORDS.